Aug. 2, 1966            B. KAN            3,263,335

PROCESS AND APPARATUS FOR FREEZE DRYING UTILIZING DRY GAS

Filed Oct. 31, 1963            4 Sheets-Sheet 1

3,263,335
PROCESS AND APPARATUS FOR FREEZE DRYING
UTILIZING DRY GAS
Billy Kan, Newton, Mass., assignor, by mesne assignments, to United Fruit Company, Boston, Mass., a corporation of New Jersey
Filed Oct. 31, 1963, Ser. No. 320,343
14 Claims. (Cl. 34—5)

This application is a continuation-in-part of my copending application S.N. 266,874, filed March 21, 1963.

This invention relates to the preserving of foodstuffs by the freeze-drying technique. In this technique, foodstuff is frozen so that essentially all the water content thereof is in solid form. The frozen foodstuff is placed in a vacuum chamber and heated. The heat is transferred to the frozen water which sublimes rather than melts, so long as the partial pressure of water vapor is maintained below about 4 mm. Hg abs. Water vapor is condensed by refrigeration coils and thus removed from the system.

The advantages of freeze drying over other methods of food preservation include prevention of oxidation, freedom from refrigeration requirements in storage and transit of foods, and superior taste, nutritional value, and ease of reconstitution of the food product by the addition of water. However, widespread usage of the freeze drying technique has been limited by the long drying times required.

The drying time is subject to the following limitations. The heating means is limited by the danger of scorching dry outer layers of the food product. The rate of heat transfer is limited by the fact that contact heaters are undesirable because of the danger of scorching. Heaters located at a distance from the food transmit heat primarily through radiation since the requisite low air pressure of the drying chamber does not provide good conduction or convection. As ice in the outer layers of the food product is sublimed, the outer layers become cellular and afford poor heat transfer from the food surface to the icy interior of the food product.

It is therefore a principal object of the invention to provide a method of accelerating the drying time of the freeze drying process in order to make freeze drying economically more competitive with other techniques of food preservation.

It is another principal object to provide an improved process of freeze drying, and apparatus for carrying out the process, on a commercial scale.

It is a related object of the invention to avoid the dangers of thawing or melting of the ice during the drying cycle, scorching the food product or retaining an excessive residual moisture in the food product which would support bacterial growth.

In general, these objects are carried out by providing a process in which an inert dry gas is injected into the drying chamber while heating the product. Heat transfer within the dry outer layers of the product is improved. The dry gas also prevents the formation of local concentrations of water vapor in the chamber. The preferred gases for this purpose are hydrogen or helium, which have high conductivities, but present minimum impedance to the flow of water vapor, because of their high rates of interdiffusion with water vapor.

Water vapor evolves so rapidly from the product that it is necessary to maintain good conditions of flow from the product to the condenser. Otherwise, the partial pressure of water vapor would build up to above 4 mm. Hg abs. and melting would occur within the product. In one preferred embodiment, the drying area and condenser are in the same chamber with no ducts or other substantial impediments to flow therebetween. In a second preferred embodiment separate drying and condensing chambers are connected by a high conductance tube, free of restrictions. In both instances, the dry gas is swept away by the water vapor and into the condensing zone. The heat transfer benefits of the dry gas are then lost.

It is therefore a further and more specific object of the invention to provide process and apparatus for maintaining the dry gas in the drying zone for maximum periods of time consistent with economy of equipment, economic gas usage and free flow of water vapor.

It is another specific object of the invention to provide an improved freeze drying process and apparatus wherein a charge of dry gas is circulated back to the drying zone from the condensing zone to utilize the improved heat transfer characteristics of the dry gas to maximum advantage.

These and other objects of the invention will in part appear hereinafter.

The invention accordingly comprises the method involving the several steps and the relation and the order of one or more of such steps with respect to each of the others and the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein.

Figure 1:
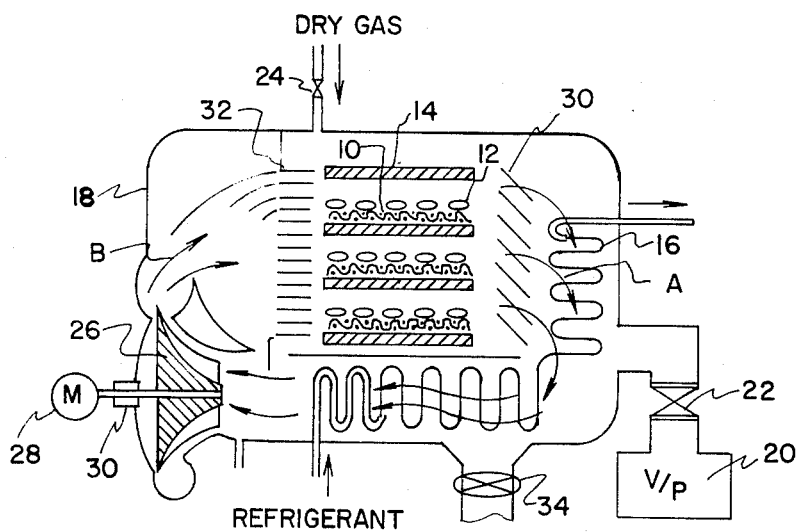
FIG. 1 is a schematic view of a first embodiment of the apparatus of the present invention.

Referring now to FIG. 1 there is shown a first species of the invention. The apparatus comprises mesh shelves 10 for holding frozen particles 12 of food to be dried, such as shrimps or peach slices or chunks of meat. Radiant heating panels 14 are disposed between the shelves for heating the product. Such heating carried out at low pressures sublimes water vapor from the ice within the frozen food product. The water vapor is condensed at refrigeration coils 16 to remove it from the system.

In using the apparatus for drying shrimp, the temperature of the heating panels 14 is maintained at about 300° F. for the initial portion of the drying cycle and then lowered to about 150° F. to avoid scorching dry outer layers of food product. The condenser temperature is maintained at about minus 35° F. This provides a sufficiently rapid condensation to remove the evolving water vapor before its partial pressure can rise above the critical limit of 4 mm. Hg. Lower condenser temperatures would unduly raise refrigeration costs in proportion to the benefits gained thereby.

The drying and refrigeration zones are enclosed in a common vacuum chamber 18 evacuated by a rotary gas ballast pump 20 via a valve 22. After filling the shelves 10 with frozen food product 12 a chamber door (not shown) is closed, and the chamber is evacuated to a residual air pressure, dependent upon condenser temperatures of less than 0.2 mm. Hg abs. (torr) by pump 20 in about five minutes. The valve 22 is then closed to completely isolate the chamber. Heaters 14 are operated and a very rapid evolution of water vapor from the food product begins.

In accordance with the present invention a charge of dry gas is injected into the chamber via valve 24 during an early part of the cycle. The dry gas, which may be hydrogen or helium, remains in the chamber throughout most of the drying cycle and is handled in the manner described below to shorten the cycle time necessary to achieve a given amount of drying.

The principal benefits realized are that the total pressure within the food product and in the zone between the heaters and food is raised and that local concentrations of water vapor are avoided. The pressure increase, together with the high thermal conductivity of hydrogen or helium, substantially raises the amount of heat supplied to the food at a given radiator temperature. Hydrogen and helium have the highest coefficients of interdiffusivity with water vapor compared to other gases. This allows the water vapor to escape from the food product without intolerable impedance from the dry gas as the dry gas diffuses through the dry, porous outer layer of food. Thus, the partial pressure of dry gas may be as high as 10 mm. Hg while maintaining the partial pressure of water vapor below four mm. Hg, depending on operating temperatures and food product. In high density shelf packing practice, it is preferred to maintain a backfilled chamber pressure of 7 torr after a substantial outer layer of food product has formed. During the early part of the cycle, a pressure of 1–4 torr is preferred if no shrinkage is tolerable and 4–12 if slight shrinkage is tolerable, under the temperature conditions described above for a preferred embodiment.

A principal obstacle to realizing the benefits of the dry gas is that the water vapor sweeps some of the dry gas before it into the refrigeration zone. The dry gas cannot condense on the coils 16 or otherwise interfere with the condensation process; but it is useless in the region of coils 16. The dry gas must be maintained in the heating zone to realize the above benefits. A fan 26 is provided to accomplish this purpose. The fan is of the centrifugal flow type to provide high circulation rates with sufficient head to overcome pressure drops due to losses in chamber 18 at low cost. A motor 28 drives the fan via a conventional rotary seal 30. Axial flow fans are preferred in those commercial production units where flow losses are low. Centrifugal flow fans are preferred for commercial production units having high flow losses. Small size positive displacement blowers are preferred for laboratory size freeze driers. Louvres 30 and 32 are provided so smooth out the flow of water vapor and dry gas between the heating and condensing zones and to serve as heat reflecting barriers between these zones. In the limited space afforded by the common chamber 18 it would be less desirable to have the coils 16 directly exposed to radiant heaters 14. Louvres 32 smooth flow from the fan to the heating zone and are dimensioned to uniformly distribute the helium flow over all the shelves 10. Ice collected on coils 16 and on the chamber walls is cleaned out via drain valve 34 between drying cycles.

Figure 2:
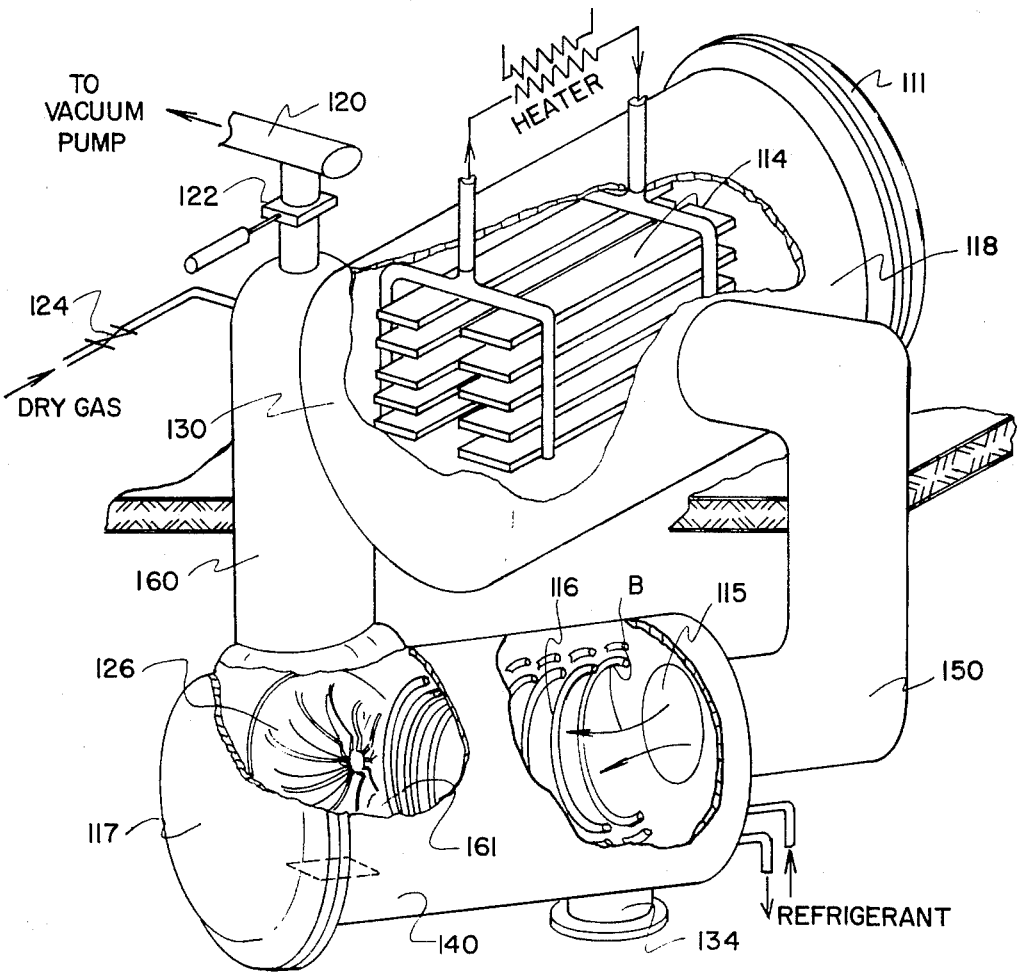
FIG. 2 is a schematic view of a second embodiment of apparatus of the present invention.
Figure 2A:
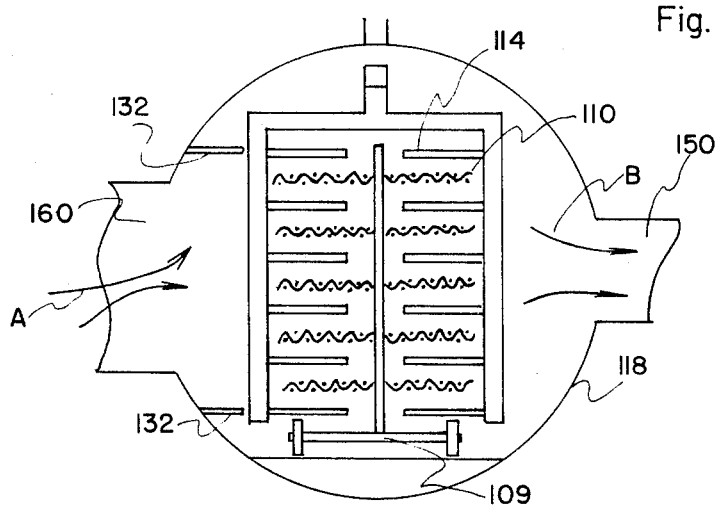
FIG. 2A is a sectional view through the dry chamber of FIG. 2.

FIGS. 2 and 2A show a second species of the apparatus wherein the heating zone, condensing zone and fan are maintained in separate chambers for lower construction costs and greater ease of maintenance. The heating platens 114 are in the form of plate coils with serpentine pipes (not shown) therein. Heat transfer oil is circulated in a closed loop for heating the platens. The platens are centrally split for easy access for servicing. The mesh shelves 110 are mounted on a truck 109 for removal via door 111. The diameter of pipe 160 and fan 126 are approximately equal to the height of the stacked shelves 110. Baffles 132 confine the flow of dry gas to the drying zone. The condenser unit 140 is provided with an ice drain port 134 and an access door 117. The refrigerant coils 116 are cylindrically arranged so that gas enters through port 115 and flows down the length of condenser 140 and finds it ways to exit port 161 by counter flow. This arrangement efficiently utilizes the condenser volume and surface area of the pipes 116. The curved length of pipe 150 between the heating and condensing zones makes louvres unnecessary. The conductance of the pipes 150 and 160 is high compared to that in the drying zone. The conductance in the drying zone is limited by the close spacing of shelves 110 and heaters 114.

In both embodiments the flow into and out of the heating zone is indicated by arrows A and B, respectively. The fan, or fans, would generally be of larger diameter and rotate at about 1,000 r.p.m., thereby minimizing sealing problems. If higher speeds are desired, the seal can be double pumped. It is also possible to mount an electric motor within the hermetically sealed walls.

The process of the present invention, utilizing dry gas, can cut the cycle time in half. More efficient utilization of the heating and condensing equipment more than compensates for the fan costs.

Figure 3:
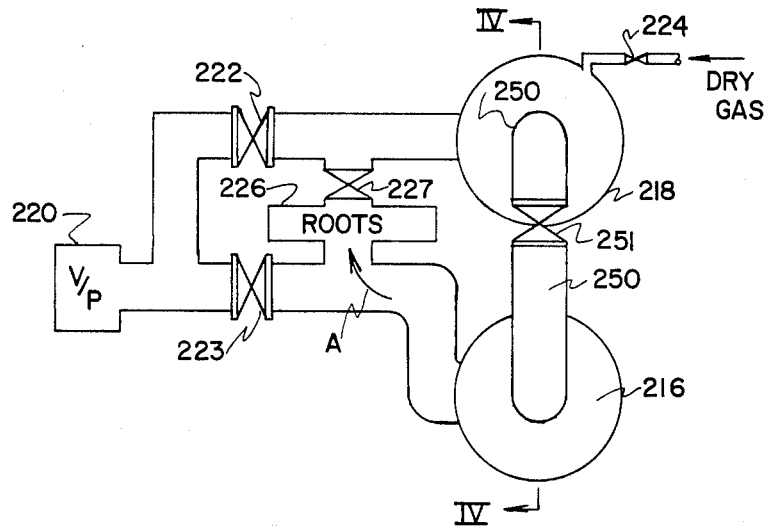
FIG. 3 is a schematic view of a laboratory-scale apparatus used to demonstrate the process of the invention.

Referring now to FIG. 3, there is shown an apparatus used to practice the process of the present invention on a smaller scale than that contemplated by the species described above. The apparatus of FIG. 3 was used to make several runs as described in the non-limiting examples below.

The conventional portion of the apparatus comprises a drying chamber 218 connected to the condenser 216 via line 250 and valve 251. The chambers are evacuated by pump 220 via valves 222 and 223. The drying chamber accommodates stacked shelves 210. Radiant heaters 214 are interspersed between the shelves. The heaters comprise plate coils with heat transfer oil circulating therethrough. The oil is circulated in a closed cycle and maintained at a desired temperature by an oil heater 215.

This conventional apparatus is modified by the addition of a gas injection valve 224 and a Roots blower 226 and a blower valve 227. The blower operates at a volumetric speed of about 1250 cubic feet per minute at a rated speed of 1760 r.p.m. and has a compression ratio on the order of 10:1.

Figure 4:
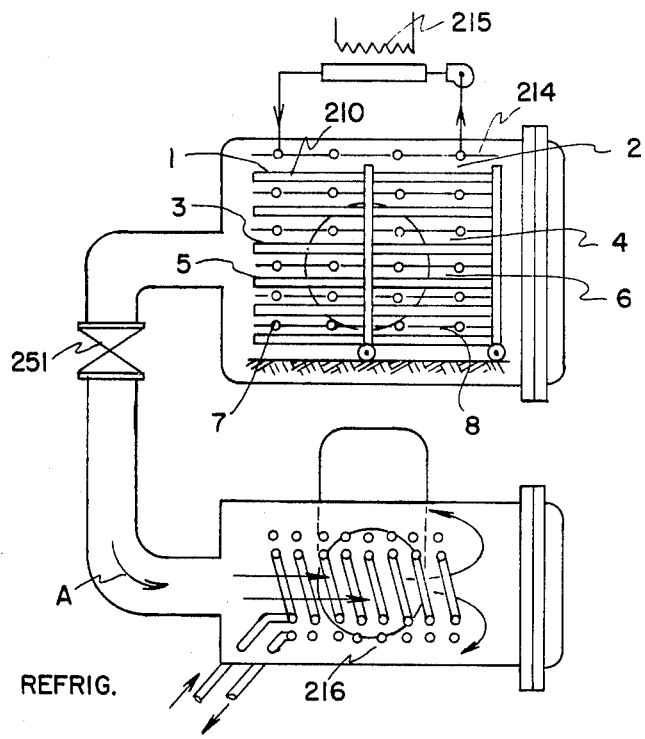
FIG. 4 is a sectional view, cut as indicated by the lines IV—IV in FIG. 3.

In the runs shrimps are placed in the tank at the locations designated 1–8 in FIG. 4. At each location a single test shrimp is surrounded by four other shrimp to simulate a commercially packed shelf. Each test shrimp is weighed at the beginning of a drying run (weight W) and at the end of a drying run (weight $w$). Then each test shrimp is baked to complete dryness and weighed again (weight $w^1$). The residual moisture at the end of a drying run, compared to the original moisture, is then:

$$\frac{w-w^1}{w}(100\%)$$

The weights W are used for standards in comparing the several runs on an equal basis. Results are expressed in residual moisture percentages for each test shrimp or mean residual moisture percentages for eight test shrimp handled in a single run.

*Example 1*

Conventional drying cycles, drying cycles according to the invention, and drying cycles recirculating air and nitrogen were compared. In all cases the pumpdown was completed while the heater oil was at 150° F. Then the heaters were raised to 300° F. and held at this temperature for one hour. At the end of the hour the supply of heat to the heat transfer fluid was stopped and the temperature of the heaters was allowed to drift downwardly while the cycle was continued for another hour. In runs 3 and 4 the drying chamber was lined with aluminum foil to cut heat losses during the second hour. This produced some improvement in residual moisture. The results are tabulated as follows:

CONVENTIONAL DRYING

| Run: | Mean residual moisture, percent |
|---|---|
| 1 | 43.6 |
| 2 | 44.5 |
| 3 | 37.6 |
| 4 | 37.1 |

*Run 5.*—In another run, valve 227 was opened, valves 222 and 223 were closed and blower 226 was operated at 1760 r.p.m. to recirculate the air for two hours. The mean residual moisture was 31.0%.

Using the same two hour heating cycle, several runs were made using helium recirculation. By introducing helium through valve 224 to raise the chamber pressure and recirculating helium via blower 226 from condenser 216 to the drying chamber, substantial improvement in drying was obtained by recirculating helium.

HELIUM DRYING

| Run | Chamber Pressure, mm. Hg | Blower Speed, r.p.m. | Mean Residual Mosture, Percent | Shrinkage |
|---|---|---|---|---|
| 6 | 12 | 1,760 | 0.8 | Medium. |
| 7 | 12 | 1,760 | 0.7 | |
| 8 | 12 | 1,760 | 1.0 | |
| 9 | 7 | 1,760 | 2.3 | Slight. |
| 10 | 7 | 1,760 | 4.4 | |
| 11 | 7 | 1,760 | 2.2 | |
| 12 | 7 | 880 | 1.2 | |
| 13 | 7 | 880 | 2.2 | |
| 14 | 7 | 440 | 2.4 | Do. |
| 15 | 7 | 440 | 0.6 | Do. |
| 16 | 4 | 880 | 3.9 | None. |
| 17 | 2 | 1,760 | 4.7 | Do. |
| 18 | 2 | 1,760 | 3.5 | Do. |

Another control run (Run 19) was made recirculating nitrogen for two hours. A pressure of 2 torr was maintained. The mean residual moisture was 32.0% and there was substantial shrinkage of the shrimp.

*Example 2*

Control runs (Runs 20 and 21) were made by conventional freeze drying process for six hours while maintaining the heaters at 150° F. throughout. The mean residual moistures were 2.0% and 2.4%.

An important aspect of helium recirculation is that the reduced drying times must apply to all shrimp (or other food product) in the chamber. There is no effective and economic technique for individually inspecting the shrimp and one shrimp with excessive residual moisture can create a health hazard.

*Example 3*

Two helium recirculation runs were made and the results were correlated with the locations 1–8 in the tank, as shown in FIG. 4.

Run 22—2 torr

| Location | Residual Moisture, percent |
|---|---|
| 1 | 5.2 |
| 2 | 13.5 |
| 3 | 1.1 |
| 4 | 0.4 |
| 5 | 0.2 |
| 6 | 0.0 |
| 7 | 3.2 |
| 8 | 4.1 |

Run 23—7 torr

| Location | Residual Moisture, percent |
|---|---|
| 1 | 2.7 |
| 2 | 5.2 |
| 3 | 0.6 |
| 4 | 0.0 |
| 5 | 1.2 |
| 6 | 0.4 |
| 7 | 3.1 |
| 8 | 5.3 |

The shrimp at locations 3–6 were drier than those at locations 1, 2, 7 and 8. The configuration of chamber 218 is such that the helium tends to channel through the shelves in the center. While the total pressure would be constant through the chamber, the fraction of total pressure attributable to water vapor partial pressure would be greater at the top and bottom shelves and at the ends of the shelves near the condenser. It is therefore desirable to insure even distribution of the helium. This is accomplished by the large area of gas conductance between the fan exit and the restricted area between the platens and product holder in FIGS. 1 and 2. The helium thus tends to distribute itself. Where a narrow conduit is provided for the fan exit, as in FIG. 3, a fluid distributor should be added to spread the helium flow to remote levels of product. It is also desirable to maintain a sufficient head so that no shelf location will have a water vapor partial pressure in excess of 4 torr.

*Example 4*

A series of runs was made with an improved heating cycle. The oil in the heating coils was preheated and the drying cycle started with the radiant heaters at 300° F. This high temperature was maintained for one hour. Then the oil heating was stopped and the temperature was allowed to drift downwardly for the remainder of the cycle.

| Run | Total Pressure, mm. | Time, hrs. | Mean Residual Moisture, Percent | Shrinkage |
|---|---|---|---|---|
| 24 | 7 | 2 | 0 | Slight. |
| 25 | 7 | 1.5 | 3.5 | Do. |
| 26 | 7 | 1.5 | 1.5 | Do. |
| 27 | 4 | 1.5 | 13.8 | |
| 28 | 4 | 1.5 | 9.2 | |
| 29 (control) | | 2 | 31.0 | |
| 30 (control) | | 2 | 27.3 | |
| 31 (control) | | 2.5 | 22.0 | |

In control runs 29–31, the drying chamber was insulated with aluminum foil. Similar control run (Run 32) was made with a partial pressure of nitrogen (3.5 mm. Hg), injected into the chamber and recirculated at full blower speed for two hours. The mean residual moisture was 25.7%.

*Example 5*

A manifold was built into chamber 218 at port 228 to uniformly distribute the helium over the shelves 210. The 1.5 hour helium drying cycles of Example 4 were repeated, using a pressure of 4 torr.

| Run | Mean Residual Moisture | Shrinkage |
|---|---|---|
| 33 | 5.4 | None. |
| 34 | 2.8 | Do. |
| 35 | 5.4 | Do. |
| 36 | 1.2 | Do. |
| 37 | 2.3 | Do. |

*Example 6*

Fresh peach slices were dried in the apparatus of FIGS. 3 and 4 without dry gas injection. A cycle time of 7½ hours was required to reach dryness. The use of dry gas recirculation with the blower running at full speed allowed the cycle to be shortened to 4 hours to reach dryness. The peach slices were ¾ inch long by ¾ inch thick and were packed on the shelves at about 1½ lb. per square foot. Only one shelf was used and the gas distributor was modified to channel gas flow over that shelf. The effect of varying the pressure cycle was shown to be significant.

| Run | Residual Moisture, percent[1] | Dry Gas | Pressure | Temperature | Remarks |
|---|---|---|---|---|---|
| 38 | 4 | He | 4 torr | 4 hrs. at 150° F | No scorching, little shrinkage. |
| 39 | 21.1 | He | 7 | 4 hrs. at 150° F | No scorching, no shrinkage. |
| 40 | 40.6 | He | 2 | 4 hrs. at 150° F | No scorching, little shrinkage. |
| 41 | 2.34 | He | (1 torr 2 hrs.) then 7 torr 2 hrs | ½hr. at 300° F / 1½ hr. at 200° F / 2 hrs. at 150° F | No scorching, no shrinkage. |
| 42 | 1.29 | H₂ | (1 torr 2 hrs.) then 7 torr 2 hrs | ½ hr. at 300° F / 1½ hr. at 200° F / 2 hrs. at 150° F | Do. |
| 43 | 3.18 | H₂ | (1 torr 2 hrs.) then 7 torr 2 hrs | ½ hr. at 300° F / 1½ hr. at 200° F / 2 hrs. at 150° F | No scorching, very little shrinkage. |
| 44 (control) | 4.65 | | .15 | 1 hr. at 300 / 6¼ hrs. at 150 | Edge scorching, very little shrinkage. |
| 45 (control) | 1.65 | | .15 | ½ at 300° F / 1 at 250 / ½ at 200 / 5½ at 150 | Very little scorching, no shrinkage. |

[1] Random samples.

The results of Example 6 may be explained as follows. In the beginning of a drying cycle when there is only a thin dried cellular layer in the food product the total rate of heat transfer is not greatly affected if a low dry gas pressure is maintained to prevent the ice from thawing. In the latter stages of drying when radiator temperatures are lower and the dried layer is of substantial thickness the total rate of heat transfer will benefit from a higher dry gas pressure, but the ice at the core of the food product will not melt because the radiator temperatures are lower. The raising of dry gas partial pressure may be correlated with the lowering of radiator temperature to give further reduction in cycle time.

Thus, it is a further aspect of the present invention that the temperature of the radiators is adjusted downwardly through the drying cycle to prevent scorching while the partial pressure of dry gas is initially low and is increased after a substantial dry outer layer is formed on the food product. As a rough measure of the rates of adjustment, it should be noted that the chamber pressure is maintained below 4 torr while recirculating dry gas for an initial period and thereafter may be raised above 4 torr by back-filling with more dry gas without danger of shrinkage. This pressure is maintained in the drying zone by the above-described forced recirculation. The initial period is a function of the thickness of the dry outer layer of food product and the heat output of the heaters. Runs 47–50 show a preferred cycle of pressure and heating.

*Example 8*

A microbalance was installed in the freeze drier to weigh shrimp during runs. Conventional and helium drying cycles were run to bring shrimp to dryness by the two methods. The conditions of the two runs were as follows:

| | He Cycle | Std. Cycle |
|---|---|---|
| Initial Weight | 133 | 131 grams. |
| Loading Density | 1.35 | 1.33 lb. per sq. ft. shelf space. |
| Final H₂O content | <1% | <1%. |
| Time, minutes | 120 | 240. |
| Condition | Good | Good, though slightly scorched. |
| Temperature cycle: | | |
| 0–1 hr | | |
| 1 hr.–1½ hr | | |
| 1½–2 hr | 300° F. (decreasing to 200° F.) | Radiators at 300° F. decreasing to 200° F. (held at 200). |
| 2–2½ hr | | |
| 2½–4 hr | | |
| Pressure cycle | 4 torr for 90 min., then 7 torr for 30 min. | 0.12 to 0.15 torr continuously. |

The blower was run at full speed and its flow concentrated on the shrimp in the helium cycle.

*Example 7*

| Run | Residual Moisture, Percent | Dry Gas | Pressure | Temperature | Scorching | Shrinkage |
|---|---|---|---|---|---|---|
| 46 | 5.94 | He | 1 torr 2 hrs., 7 torr 1½ hrs. | 1 hr. at 300, 1 hr. at 200, 1½ hrs. at 150. | Very little | No. |
| 47 | 1.42 | He | 1 torr 1½ hrs., 7 torr 2 hrs. | ¾ hr. at 300, ¼ hr. at 300–200. | No | No. |
| 48 | 2.18 | He | 1 torr 1½ hrs., 7 torr 2 hrs. | 2 hr. at 200, ½ hr. at 150 | No | No. |
| 49 | 1.39 | H₂ | 1 torr 1½ hrs., 7 torr 2 hrs. | 2 hr. at 200, ½ hr. at 150 | No | No. |
| 50 | 1.26 | H₂ | 1 torr 1½ hrs., 7 torr 2 hrs. | 2 hr. at 200, ½ hr. at 150 | No | No. |

*Blower run at full speed.

Figure 6:
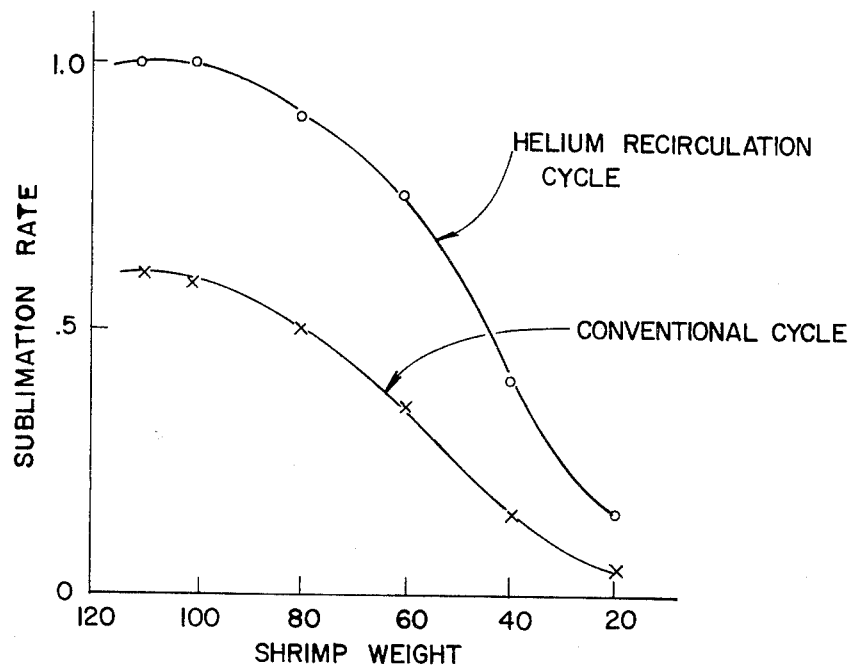
FIG. 6 is a graphic representation of the rate of water vapor removal as a function of product weight using the data of FIG. 5.
Figure 5:
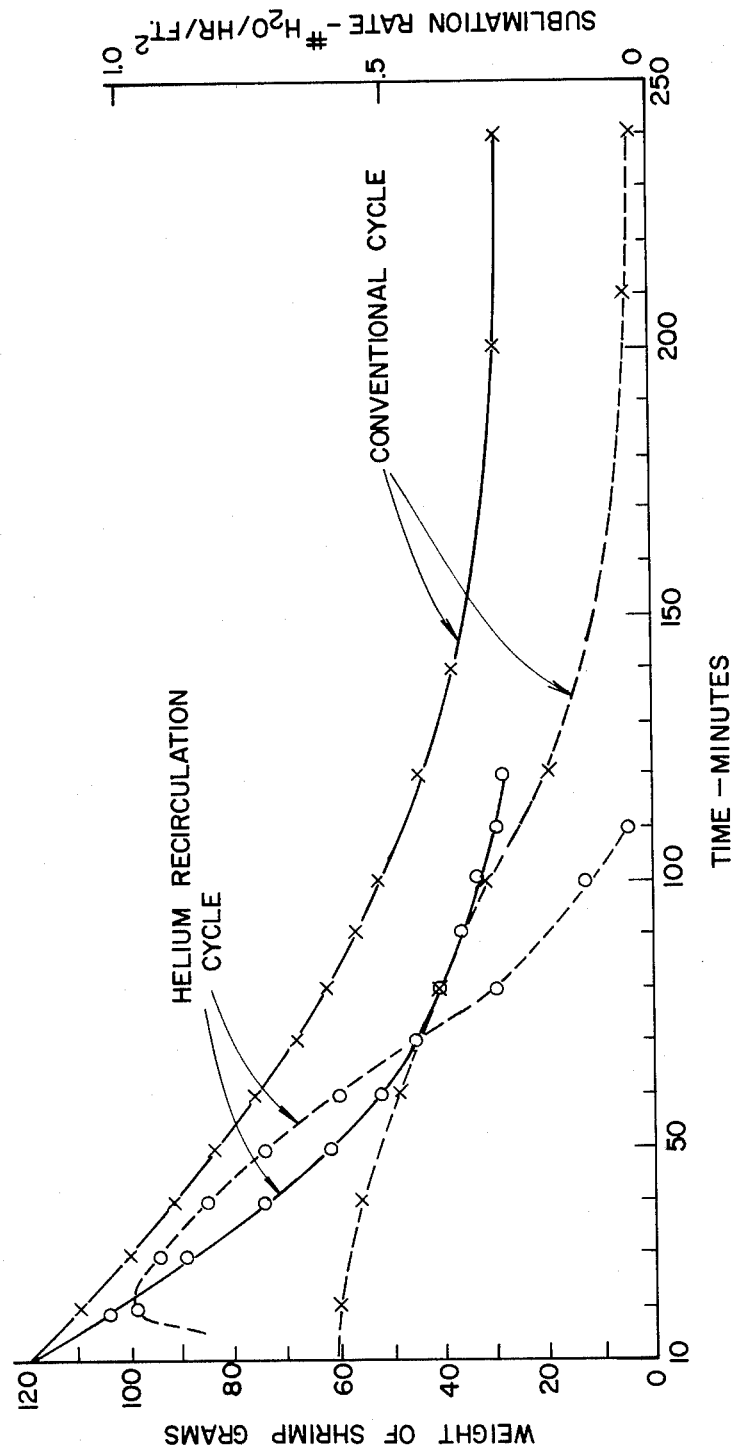
FIG. 5 is a graphic comparison of the rates of water vapor removal as a function of time in a standard freeze dry cycle and a freeze dry cycle according to the invention.

The speed at which dryness was reached is indicated in the curves of FIG. 5 which are traces of product weight vs. time. The dashed line curves show the same data replotted in terms of sublimation rate. FIG. 6 shows the sublimation rate as a function of product weight in the two cycles.

The limiting condition for the use of the dry gas cycle is the danger of melting shrimp at locations remote from the dry gas blower. At the beginning of the drying cycle when the water evolution rate is highest, dry gas is swept away from the drying zone at the highest rate. To determine required blower capacity in a helium recirculation system, the following calculation should be utilized:

$$Q_{He} = \frac{PcH - P_{H_2O} \text{ Exit}}{P_{H_2O} \text{ Exit}} Q_{H_2O}$$

where $Q_{He}$ is the helium flow rate requirement, $PcH$ is the drying zone total pressure, $P_{H_2O}$ is the limiting partial pressure of water vapor in the drying zone, and $Q$ is the rate of water vapor evolution.

In the helium cycle of Example 8, a chamber pressure of 4 torr was utilized in the early part of the cycle. It is estimated that this, together with the high heat input and high condenser speed, kept water vapor partial pressure at the drying zone exit at about 1 torr. The water evolution rate is the observed sublimation rate of about one pound per square foot per hour times a shelf space of about 0.2 square feet used in the above example divided by the density of water at one torr, which is $23.5 \times 10^{-5}$ pounds per cu. ft. Thus $Q_{H_2O}$ is 850 cu. ft./hr. Substituting in the above expression $$Q_{He} = \frac{4-1}{1} 850 = 2550 \text{ cu. ft.}{\text{hour}}$$

or 43 cubic feet per minute. This requirement is easily met by the blower utilized in Example 8.

As the cycle proceeds and it becomes permissible to raise the chamber pressure, the helium flow requirement decreases. For the general case, it must be recalled that the rate of evolution of water vapor at the beginning of a cycle may be higher than the one pound per sq. ft. per hour noted above and that water vapor density varies widely with pressure for purposes of computing flow requirements. Correction factors may be applied to allow for channeling of helium flow and shelf width in a particular freeze drying unit construction.

Many changes can be made within the scope of the apparatus and process invention. For instance, a plurality of units such as the one shown in FIG. 2 can be provided side by side with a common roughing manifold 120 and a single vacuum pump servicing all the units; the timing of the several units' operations can be staggered so that a small pump may be used. A continuous conveyor belt unit can be used, in lieu of the various batch units, shown in the drawings. The process of the invention may be implemented by manual control of the parameters, by timers or by automatic controls responsive to ice temperature and drying chamber pressure.

Since certain changes can be made in the above described apparatus and process without departing from the scope of the invention herein involved, it is intended that all matter contained in the above description shall be regarded as illustrative and not in a limiting sense.

What is claimed is:

1. In a freeze drying apparatus, the combination comprising means defining an evacuated drying zone and an evacuated condensing zone and first and second high conductance paths connecting said zones, means for supporting foodstuff in said drying zone, means for heating said foodstuff, means for condensing water vapor in said condensing zone, means for charging a dry inert gas into said zones and blower means for circulating said dry gas from said condensing zone to said drying zone via said second path, the average gas conductance of said second path being in excess of the average conductance through the drying zone.

2. The combination of claim 1 wherein at least said drying and condensing zones and said first path are in a common chamber.

3. An improved freeze drying method for a heater-condenser-drying shelf system, comprising the steps of evacuating the system, isolating the system, and partially backfilling with a dry, noncondensible, inert gas, maintaining the system isolated from evacuating means for a continuous period at least throughout half the drying cycle time so that the dry gas remains in the system, maintaining a flow of water vapor from the foodproduct to the condenser and diffusing dry gas into the cellular dry outer layers of food product so that a certain partial pressure of dry gas is continuously maintained in the layers throughout said period of isolation, the said partial pressure of dry gas being at least equal to the partial pressure of water vapor in said shelf area and less than 12 torr, as measured in the shelf area most remote from the condenser inlet.

4. The method of claim 3 wherein the dry gas is selected from the group consisting of hydrogen and helium.

5. The method of claim 3 wherein the said diffusion is maintained by recirculating dry gas within the system to return dry gas to the food product which is swept away by water vapor.

6. The method of claim 5 wherein the removal of water vapor is at a rate in excess of one half pound per square foot of drying shelf and the rate of recirculation of dry gas (Q) is above the figure determined by $$Q = \frac{PcH - 4}{4} \text{ multiplied by } \frac{R \text{ multiplied by } A}{d}$$

where $PcH$ is the chamber pressure, $R$ is the rate of removal of water vapor, $A$ is the shelf space in square feet and $d$ is the density of water vapor at 4 torr and 100° F.

7. In a freeze drying apparatus, the improvement comprising, in combination, a stacked array of shelves for holding foodstuffs to be dried, radiant heaters located between the shelves, means for evacuating air from the zone of said shelves, a charge of noncondensible inert gas, means for keeping the noncondensible gas well mixed with water vapor and residual air in the zone of said shelves and comprising a fan blowing said gas between said shelves and comprising guide means located between the fan and shelves for distributing gas uniformly over the shelves, said guide means including louvres stacked to one side of the shelves.

8. The combination of claim 7 wherein the shelves, heaters, fan and guide means are located in a common hermetically sealed chamber.

9. The combination of claim 8 wherein the condenser of said freeze drying apparatus in also located in said chamber and wherein guide means are provided between the shelves and the condenser, the condenser being freely accessible to water vapor evolving from the foodstuff.

10. An improved method for operating a heater-condenser-product holder freeze drying unit wherein a product, the major volume of which comprises a frozen volatile constituent, is held in a zone on the product holder and heated to sublime the volatile constituent which is collected at the condenser, the partial pressure of the volatile constituent being held below its thermodynamic triple point by operation of the system under vacuum, the improved method comprising the steps of providing a small partial pressure of dry, noncondensible gas before a thick, dry outer layer is formed in the product and increasing the partial pressure of the dry gas as the dry layer grows towards the core of the product and continuously injecting the dry gas into the zone of the product holder.

11. The method of claim 10 wherein the heating is decreased as the dry layer of food product grows and the partial pressure of dry gas is raised.

12. The method of claim 10 wherein the injection of the dry gas to the desired partial pressure of dry gas is maintained by forced recirculation from the condenser.

13. An improved method for operating a heater-condenser-product holder freeze drying unit wherein frozen food product is held on the product holder and heated to sublime water vapor from ice within the product which is collected at the condenser, the unit being evacuated by vacuum pump means to maintain the partial pressure of water vapor below 4 torr, the improved method comprising the steps of isolating the unit from the vacuum pump means and backfilling with a limited amount of a dry gas selected from the group consisting of hydrogen and helium to provide an initial predetermined partial pressure of dry gas within the unit, continuously recirculating the dry gas to the zone of the product holder from other zones of the unit, lowering the heat output of the heater as the product dries during the period of maintaining a partial pressure of dry gas to prevent scorching of the food product, the said initial predetermined amount of dry gas partial pressure being sufficiently small to avoid ice thawing, and comprising the additional step of backfilling more dry gas as the product dries and heater output drops, whereby the rate of drying is accelerated without ice melting and shrinkage of the product.

14. An improved method for operating a heater-condenser-product holder freeze drying unit wherein said food product is in the form of solid segments packed together in layers and supported on shelves and the unit is initially evacuated to a residual air pressure of less than one torr, then backfilled with dry gas to produce a total pressure between 1 and 5 torr while subliming water vapor therefrom at a rate in excess of .5 pounds per hour per square foot of shelf surface and the said additional step of backfilling more dry gas being initiated after more than half the weight of water vapor is removed and comprises raising the total pressure above 5 torr.

References Cited by the Examiner

UNITED STATES PATENTS

| | | | |
|---|---|---|---|
| 1,458,403 | 6/1923 | Glessner | 34—15 |
| 2,333,850 | 11/1943 | Dunkley | 34—5 |
| 2,435,503 | 2/1948 | Levinson | 34—5 |
| 2,564,475 | 8/1951 | Fischer | 34—5 |
| 2,751,687 | 6/1956 | Colton | 34—5 |
| 2,765,236 | 10/1956 | Blaine | 34—5 |
| 3,010,216 | 11/1961 | Ravet | 34—92 |

WILLIAM J. WYE, *Primary Examiner.*